(12) United States Patent
Lindholm et al.

(10) Patent No.: US 7,418,576 B1
(45) Date of Patent: Aug. 26, 2008

(54) PRIORITIZED ISSUING OF OPERATION DEDICATED EXECUTION UNIT TAGGED INSTRUCTIONS FROM MULTIPLE DIFFERENT TYPE THREADS PERFORMING DIFFERENT SET OF OPERATIONS

(75) Inventors: John E. Lindholm, Saratoga, CA (US); Brett W. Coon, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 22 days.

(21) Appl. No.: 10/991,640

(22) Filed: Nov. 17, 2004

(51) Int. Cl.
*G06F 9/50* (2006.01)
(52) U.S. Cl. ............... 712/214; 718/103; 718/107
(58) Field of Classification Search ............ None
See application file for complete search history.

(56) References Cited

U.S. PATENT DOCUMENTS

| | | | |
|---|---|---|---|
| 6,463,527 B1 * | 10/2002 | Vishkin | 712/245 |
| 6,470,443 B1 * | 10/2002 | Emer et al. | 712/205 |
| 6,477,562 B2 * | 11/2002 | Nemirovsky et al. | 718/108 |
| 6,567,839 B1 | 5/2003 | Borkenhagen et al. | 718/301 |
| 7,015,913 B1 * | 3/2006 | Lindholm et al. | 345/501 |
| 7,096,470 B2 | 8/2006 | Brown et al. | 718/102 |
| 2004/0216106 A1 * | 10/2004 | Kalla et al. | 718/100 |
| 2005/0138328 A1 * | 6/2005 | Moy et al. | 712/205 |
| 2006/0004995 A1 * | 1/2006 | Hetherington et al. | 712/235 |
| 2006/0136919 A1 | 6/2006 | Aingaran et al. | 718/100 |

* cited by examiner

*Primary Examiner*—Kenneth S Kim
(74) *Attorney, Agent, or Firm*—Cooley Godward Kronish LLP

(57) ABSTRACT

A graphics processor buffers vertex thread and pixel threads. The different types of threads issue instructions corresponding to different sets of operations. A plurality of different types of execution units are provided, each type of execution unit servicing a different class of operations, such as an executing unit supporting texture operations, an execution unit supporting blending operations, and an execution unit supporting mathematical operations. Current instructions of the threads are buffered and prioritized in a common instruction buffer. A set of high priority instructions is issued per cycle to the plurality of different types of execution units.

20 Claims, 3 Drawing Sheets

PRIORITIZED ISSUING OF OPERATION DEDICATED EXECUTION UNIT TAGGED INSTRUCTIONS FROM MULTIPLE DIFFERENT TYPE THREADS PERFORMING DIFFERENT SET OF OPERATIONS

FIELD OF THE INVENTION

The present invention is generally related to multi-threaded processors. More particular, the present invention is directed towards multi-threaded processors having dedicated execution units for executing thread instructions.

BACKGROUND OF THE INVENTION

Multi-threaded processors are of increasing interest in a variety of applications. A multi-threaded processor has multiple threads for processing information. For example, multi-threaded processors are of interest for use in Graphics Processing Units (GPUs).

A GPU commonly includes stages dedicated to performing specified functions. An emerging problem is designing a multi-threaded GPU architecture that efficiently utilizes GPU resources, such as execution pipelines.

Therefore, what is desired is an improved multi-threaded processor architecture.

SUMMARY OF THE INVENTION

A multithreaded processor buffers current instructions of threads and prioritizes the issue of current instructions to execution units. One embodiment of a processor includes a plurality of different types of execution units, each type of execution unit servicing a different class of operations. In one embodiment there is one or more of each type of execution unit. An instruction buffer buffers a set of current instructions for a plurality of asynchronous threads, each current instruction requiring an operation performed by one of the plurality of different types of execution units. An instruction scheduler prioritizes the set of current instructions and issues on each issue cycle a set of instructions from the instruction buffer to the plurality of different types of execution units.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
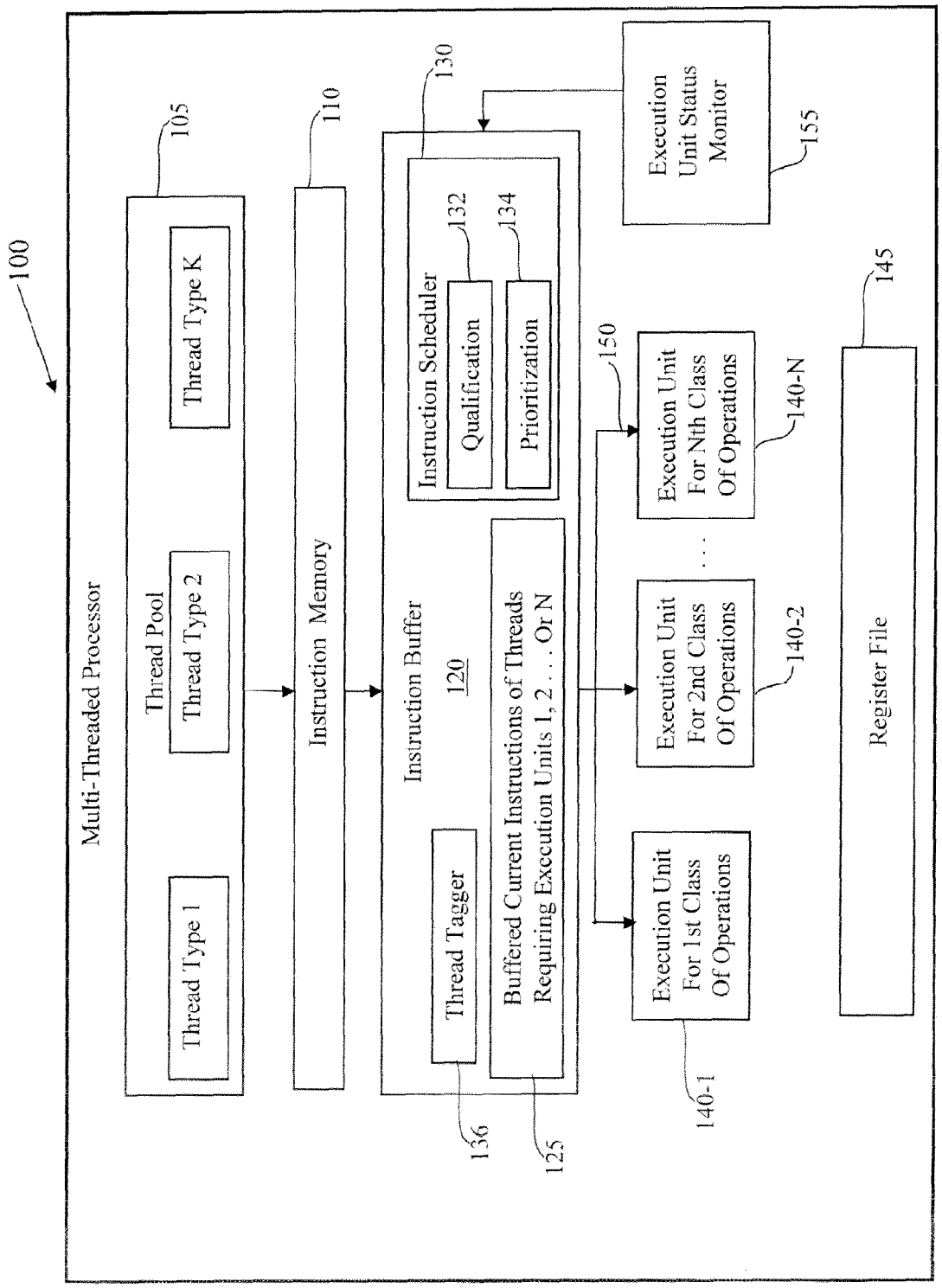
FIG. 1 is a block diagram of a multi-threaded processor in accordance with one embodiment of the present invention.

FIG. 1 is a block diagram illustrating a multi-threaded processor 100 in accordance with one embodiment of the present invention. Multi-threaded processor 100 includes a thread pool 105. In one embodiment, the threads in thread pool 105 run asynchronously, i.e., they are not synchronized with each other. Consequentially, at any one particular time, individual threads in thread pool of threads 105 may require different operations.

In one embodiment, thread pool 105 includes different thread types for processing different types of information. The threads may include an integer number of different thread types, such as thread type 1, thread type 2, ... thread type K, where there are a plurality of threads of each type within thread pool 105. A particular thread type may, for example, be a computing thread type or a graphics thread type. For example, in a Graphics Processing Unit (GPU) implementation, thread pool 105 may include vertex threads for processing vertex information and pixel threads for processing pixel information. In some implementations, different types of threads may request different types of operations. However, more generally, different types of threads may request at least one operation that is identical. For example, in some embodiments both pixel threads and vertex threads may request the same type of mathematical operation to be performed.

An instruction memory 110 fetches a current instruction for each thread based on the program counter of the thread. Instruction memory 110 may, for example, have a multi-level structure with one or more local caches (not shown) to improve efficiency.

An instruction buffer 120 associated with instruction memory 110 buffers a set of current instructions 125 for a set of threads. At any one particular time, instruction buffer 120 will have a certain number of current instructions 125 in instruction buffer 120. The number at a particular point in time depends, for example on a fetch policy used to select a new set of instructions to enter instruction buffer 120 and the issue policy used to issue instructions out of instruction buffer 120 during instruction cycles.

In one embodiment a thread tagger 136 includes logic for tagging instructions that are fetched into instruction buffer 120. The fetched instructions are tagged to indicate the type of execution unit 140 required to execute the instruction.

Each current instruction in buffer 120 has one or more attributes, such as a thread type attribute and an instruction age attribute. The thread type attribute describes the thread type associated with the instruction. The instruction age attribute may, for example, be a thread attribute related to age, such as a launch order or the age of the instruction within instruction buffer 120.

Each of the instructions in instruction buffer 120 utilizes the resources of an execution unit 140 to perform an operation required by the corresponding thread. In one embodiment, each execution unit 140-1 ... 140-N is implemented in hardware as a unit that is configured to perform a class of operations for the threads. The class of operations may include a single operation but more generally may comprise a number of different operations that execution unit 140 can perform. While each execution unit 140 may service a different class of operations, in one embodiment there is more than one execution unit 140 to service at least one class of operations.

Each execution unit 140 has an input for receiving a current instruction (not shown) and an associated latency for performing an operation for a thread, e.g., an operation will take a number of cycles to complete. In one embodiment, there is a positive integer number, N, of different types of execution units 140, such as execution units 140-1, 140-2, ... 140-N and each type of execution unit 140 is adapted to service a different class of operations for the current instructions of the threads. For example, in the context of a graphics processing unit (GPU) implementation, execution unit 140-1 may be dedicated to servicing instructions for texture operations, execution unit 140-2 may be dedicated to servicing instructions for multiply-add (MAD) operations (e.g., blending operations), and execution unit 140-N may be dedicated to servicing instructions for specialized mathematical operations, such as the reciprocal, logarithmic, exponential, or other mathematical function.

In one embodiment each execution unit 140 is an execution pipeline, such as a programmable pipeline having a plurality of stages.

The execution units 140 each have operational attributes. For example, an individual execution unit 140 may be non-stallable or may be capable of stalling. At a particular point in time an individual execution unit 140 may be in a normal or a stalled state. In an execution pipeline embodiment, the instructions are processed in stages, such that a new instruction can enter a first stage of the execution pipeline once a previous instruction has passed on to a subsequent stage.

An instruction scheduler 130 includes a qualification module 132 for qualifying valid instructions for issue to each execution unit 140. Additionally instruction scheduler 130 includes a prioritization module 134 for prioritizing the issue order of instructions. As described below in more detail, qualification module 132 and prioritization module 134 permit an optimization of the selection of instructions for issuance to the execution units 140 that improves execution unit utilization.

Instruction scheduler 130 selects a set of instructions per issue cycle to be issued to the execution units 140 via a bus 150. In one embodiment, the maximum number of instructions that may be issued per cycle is an integer number M, where $M \leq N$. For example, in a processor with a total of three different execution units 140-1, 140-2, and 140-N, the number of instructions issued per cycle may be 0, 1, 2, or 3. The maximum number. M, may be limited due to the limitations of bus 150 or other constraints. Thus, in some implementations M<N, such that only a subset of the execution units 140 can receive an instruction in a particular cycle. However, it will be understood that in an alternate embodiment that threads are grouped into convoys such that M>N. As an illustrative example, threads could be grouped into a group of ten and one group of ten instructions issued into each execution unit 140 every $10^{th}$ cycle.

Additionally, it will be understood that the instruction buffer 120 may also issue instructions to individual execution units 140 as a group. In one embodiment, threads are grouped into pairs that share the same instruction. The single instruction that the pair of threads shares is sent across bus 150. The execution unit that receives the instruction then repeats the instruction twice, once for each thread. This implementation has the benefit that the bus width does not have to be modified, i.e., a single-width bus may be utilized. However, it will be understood that in an alternate embodiment, bus 150 is a double-width bus adapted for instruction buffer 120 to fetch a pair of instructions for an execution unit 140 in each issue cycle, i.e., a pair of instructions is fetched once, then executed twice in succession by the execution unit. In this embodiment, there is a maximum number of pairs of instructions that may be issued, where $M \leq N/2$.

A register file 145 is provided for threads to perform register reads and writes. In one embodiment, register file 145 includes a bank of independent registers.

In one embodiment a scoreboard (not shown) is also included for instruction scheduler 130 to track the status of instructions executing in each execution unit 140. In some embodiments, a monitor 155 is provided to monitor the status of execution units 140-1, 140-2, . . . 140-N for instruction buffer 120. Monitor 155 may, for example, detect stalls of individual execution units 140, collisions regarding writebacks of one or more execution units 140 to register file 145, or track the status of operations in execution units 140.

Instruction scheduler 130 prioritizes the buffered instructions 125 to determine a priority for issuing instructions. For each cycle, instruction scheduler 130 selects a number of buffered instructions 125 to be issued to execution units 140-1 . . . 140-N. The instruction scheduler 130 issues a maximum number, M, of instructions per issue cycle that is less than the buffer capacity of instruction buffer 120.

Instruction scheduler 130 can select an issue order that is more efficient than that which would occur if thread pool 105 directly accessed the execution units 140 without buffering and prioritization. This is because the asynchronous nature of the threads makes it likely that the current instructions of different threads request different operations. Consequently, it is likely that work can be found for all of the execution units 140 if a sufficient number of current instructions are buffered. Increasing the capacity of instruction buffer 120 increases the statistical likelihood that instruction scheduler 130 can perform an optimization of the instruction issue order. Also, increasing the capacity of instruction buffer 120 permits different types of optimizations. For example, increasing the capacity of instruction buffer 120 increases the likelihood that current instructions 125 include a distribution of thread type attributes, instruction age attributes, or other attributes, thereby increasing the choices that instruction scheduler 130 can make to optimize the issue order. For example, the instruction buffer 120 may be sized to make it statistically likely that when instruction buffer 120 is full that instruction scheduler 130 can find a pre-selected number of instructions (e.g., at least one) that can be issued to each of the execution units 140. In one embodiment, the instruction buffer is sized so that each thread has one guaranteed slot in the instruction buffer (e.g., if there are 24 threads there are at least 24 slots such that each thread has one guaranteed slot). It will be understood that one of ordinary skill in the art could perform modeling or empirical investigations to determine the buffer capacity required for a particular implementation of processor 100 to improve the utilization efficiency of execution units 140.

The prioritization can be carried out each time instruction buffer 120 is refreshed with new instructions from thread pool 105. However, since the status of execution units can change, in some embodiments the prioritization is updated to adapt to any changes in the execution environment. In one embodiment, a rules engine (not shown) within instruction scheduler 130 may apply one or more rules to achieve a variety of objectives, such as distributing work between execution units 140 to improve the utilization of the various execution units 140 (e.g., to keep each execution unit 140 filled with instructions), avoiding the development of too large a backlog of instructions for a particular execution unit 140, and avoiding unduly delaying the execution of the threads. The particular set of rules that is applied by a rules engine will depend upon the implementation of processor 100 and upon the combination of objectives that are desired. In one embodiment, a rules engine is programmable to permit a set of rules to be programmed.

One example of a rule that may be applied by instruction scheduler 130 is a qualification rule. In one embodiment, instruction scheduler 130 qualifies an instruction for issuance to a particular execution unit only if issuance of the instruction on a particular cycle would not generate a deleterious condition. Instructions that would generate a deleterious condition are disqualified. Disqualifying instructions permits a more efficient utilization of the execution units 140. For example, in one embodiment if a particular execution unit 140 is unavailable for at least one issue cycle (e.g., the execution unit is blocked, busy, or stalled such that is not immediately available to perform an operation), the instruction scheduler 130 disqualifies instructions requiring the unavailable execution unit from being issued in that cycle. This permits, for example, issuing instructions to execution units that are available for execution of instructions. In some embodiments, information from monitor 155 is used by instruction scheduler 130 to disqualify instructions that would generate a collision of threads during writeback.

Instruction scheduler 130 may also use priority rules to assign a priority to each of the qualified instructions in instruction buffer 120. One example of a priority rule is that some thread types may be assigned a higher priority than other thread types. As an illustrative example, in a GPU implementation an instruction for a vertex thread may be assigned a higher priority than an instruction for a pixel thread.

Another example of a priority rule is a rule for assigning an issue order based upon instruction age, such as assigning a higher priority to older instructions in instruction buffer 120. For example, in one embodiment older instructions for a particular thread type are assigned a higher priority than newer instructions. As previously described, the instruction age may be any attribute related to age, such as a launch order or other attribute.

Still another example of a priority rule is a round robin scheme in which buffered instructions are issued in a round robin order. As one example, the round robin may cycle around instructions for threads of a particular thread type. More generally, any round robin scheme for distributing work in a cycle may be utilized, such as a round robin order based on cycling around the execution units.

Still yet another example of a priority rule is a rule for assigning priority based upon instruction statistics. For example, in one embodiment, priority is based upon the number of instructions requiring access to each execution unit. In one embodiment, the priority of an instruction is increased as the number of other instructions requiring the same execution unit increases. As an illustrative example, if the number of instructions increases that require a particular execution unit 140, preference may be given to issuing these instructions to reduce the backlog of such instructions.

As still yet another example of a priority rule, the priority rule may be a rule selected to increase utilization of the execution units 140 based upon program statistics regarding the likely sequence of thread types that will be fetched into instruction buffer 130. In particular, although the asynchronous threads are not synchronized, there may be statistical patterns to the number and order in which threads of different types are fetched. For example, the statistical patterns may include a burst behavior in which threads requiring a particular execution unit tend to occur in bursts. One or more rules may be based upon statistical patterns associated with a program to improve utilization of the execution units. For example, a particular program may, for example, have a statistical likelihood that closely spaced asynchronous threads will require the same execution unit. In one embodiment a spacing rule is applied that spaces out the execution of the threads to increase the statistical probability that a large percentage of the execution units have work.

Figure 2:
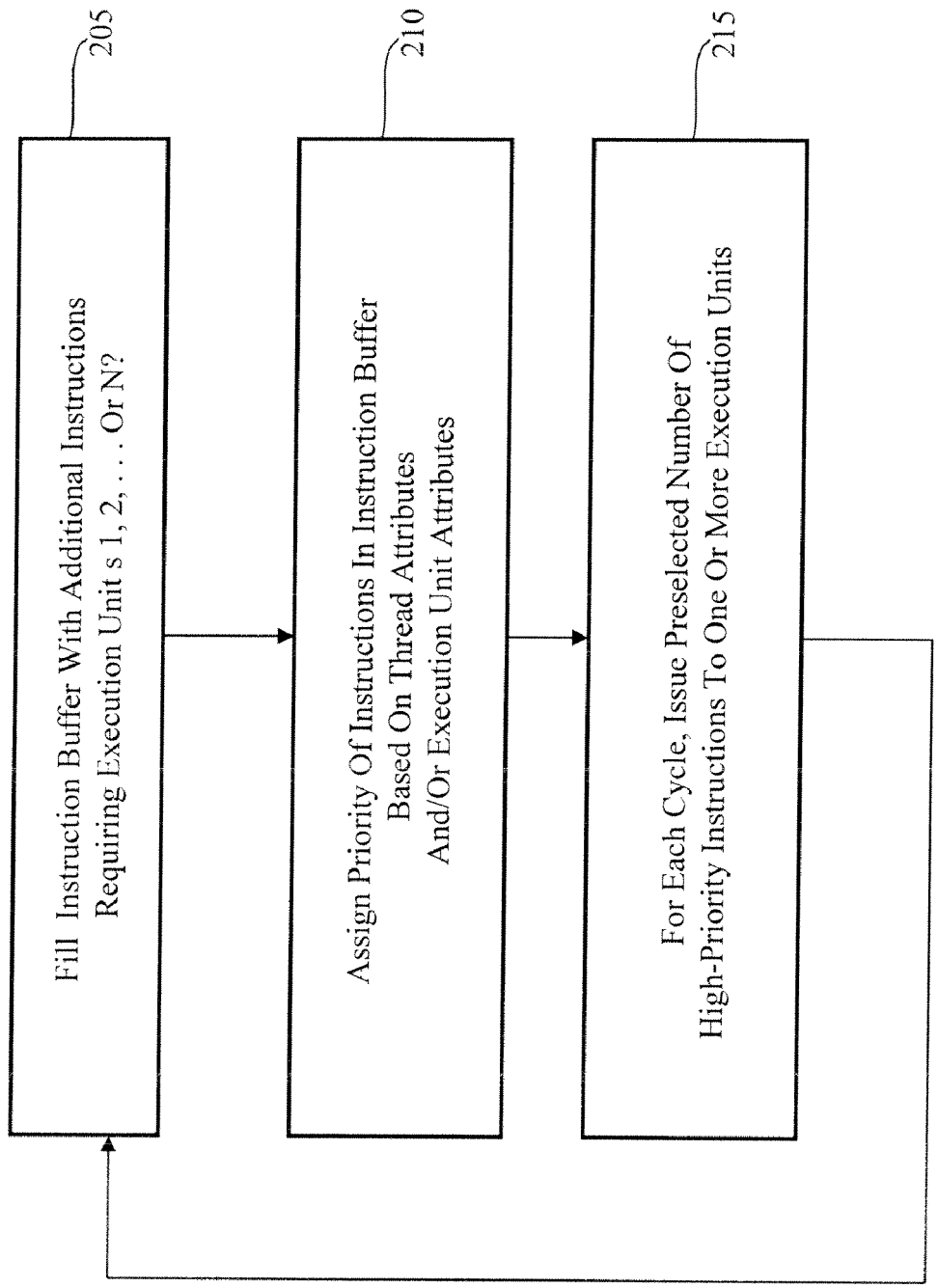
FIG. 2 is a flow chart of a method of issuing instructions to execution units in accordance with one embodiment of the present invention.

FIG. 2 is a flow chart of a method in accordance with one embodiment of the present invention. The instruction buffer is filled 205 with the instructions of threads requiring execution. In one embodiment, one or more rules are utilized by instruction buffer 120 for receiving new instructions. For example, if instruction buffer 120 has a fixed size, the rule may be based on the number of current instructions 125 in buffer 120. The priority of instructions in the buffer is assigned 210 based on thread attributes and execution unit attributes. For each cycle, a pre-selected number of high-priority instructions are issued 215 to the execution units.

Figure 3:
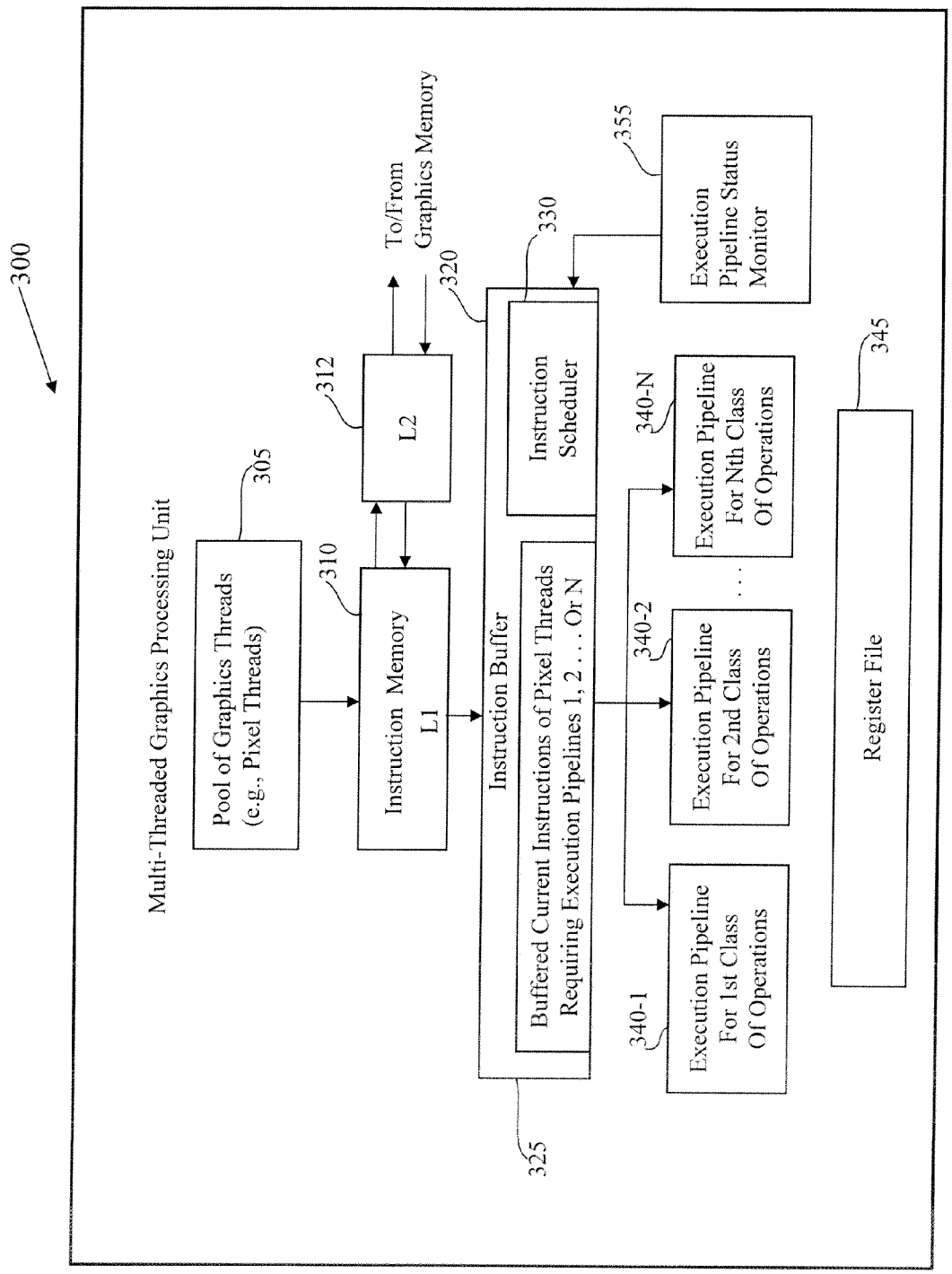
FIG. 3 is a block diagram of a multi-threaded graphics processing unit in accordance with one embodiment of the present invention.

FIG. 3 is a block diagram of an exemplary GPU implementation. Many of the elements perform similar functions as those described in regards to processor 100. In a multi-threaded GPU 300 there is a pool of graphics threads 305, such as pixel threads or vertex threads. Instruction memory 310 may comprise a level 1 (L1) cache coupled to a level 2 (L2) 312 cache. If there is a cache miss, a graphics memory (e.g., a frame buffer) may be accessed for an instruction. In this embodiment, an instruction buffer 320 buffers instructions of graphics threads 325 and includes an instruction scheduler 330. Execution pipelines 340 may comprise any execution pipeline used in a GPU for servicing graphics threads. A register file 345 is provided for register writes and a monitor 355 may be included in some embodiments for monitoring the status of execution pipelines 340.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A multi-threaded graphics processor executing pixel threads, vertex threads, and computational threads, comprising:

a thread pool of the different types of threads, each thread corresponding to a set of instructions required to perform one or more operations, the pixel threads, vertex threads, and computational threads being unsynchronized with respect to each other such that there is a statistical distribution over time of instructions associated with the different types of threads;

a plurality of operation-dedicated execution units for servicing different classes of operations and implemented as execution pipelines, each operation-dedicated execution unit adapted to execute instructions required to perform one or more operations for their corresponding thread, the one or more operations within the class of operations serviced by the each operation-dedicated execution unit;

a common instruction buffer buffering a set of current instructions for a plurality of threads from the pool of threads, each of the current instructions in the common instruction buffer tagged with a tread tagger to indicate an execution unit to execute the instruction so that an instruction required to perform a particular operation can only be executed by its tagged execution unit, the tagged execution unit dedicated to perform a class of operations including the particular operation; and an instruction scheduler for scheduling instructions to improve the utilization of the operation-dedicated execution units, said instruction scheduler prioritizing said set of current instructions and issuing on each issue cycle a set of instructions from said common instruction buffer to said plurality of operation-dedicated execution units such that each issued current instruction is assigned to its tagged execution unit and on each cycle a number of issued instructions is not greater than a maximum number, the buffering capacity of the common instruction buffer selected so that the instruction buffer has at least as many slots as the number of threads.

2. The multi-threaded processor of claim 1, wherein there are a positive integer number, N, of execution units, and said instruction scheduler may issue a positive integer number, M, of instructions per issue cycle, where M is greater than N.

3. The multi-threaded processor of claim 1, wherein said instruction scheduler generates a prioritization based on at least one of an instruction age of instructions in said common instruction buffer, a thread type associated with an instruction in said instruction buffer, and a number of instructions in said common instruction buffer requiring the services of said plurality of execution units.

4. The multi-threaded processor of claim 1, wherein said instruction scheduler has a mode of operation in which current instructions are prioritized based on thread type.

5. The multi-threaded processor of claim 4, wherein said instruction scheduler disqualifies instructions requiring the services of an execution unit that is in a state in which it is unavailable to execute said operation for at least one issue cycle.

6. The multi-threaded processor of claim 1, wherein there are a positive integer number, N, of execution units, and said instruction scheduler may issue a positive integer number, M, of instructions per issue cycle, where M is less than or equal to N.

7. The multi-threaded processor of claim 6, wherein M is less than N.

8. A multi-threaded graphics processor executing pixel threads and vertex threads, comprising:

a thread pool of different types of threads, each thread corresponding to a set of instructions required to perform one or more operations, the pixel threads and vertex threads being unsynchronized with respect to each other such that there is a statistical distribution over time of instructions associated with the different types of threads;

a plurality of operation-dedicated execution pipelines including:
a first execution pipeline dedicated to performing texture operations;
a second execution pipeline dedicated to performing multiply-add (MAD) operations; and
a third execution pipeline dedicated to performing specialized mathematical operations from the group consisting of reciprocal, logarithmic, and exponential operations;

a common instruction buffer buffering a set of current instructions for a plurality of threads from the pool of threads, each of the current instructions in the common instruction buffer tagged with a tread tagger to indicate an execution pipeline to execute the instruction so that an instruction required to perform a particular operation can only be executed by its tagged execution pipeline, the tagged execution pipeline dedicated to perform a class of operations including the particular operation; and an instruction scheduler for scheduling instruction of said pixel threads and said vertex threads to improve the utilization of the operation-dedicated execution pipelines, said instruction scheduler prioritizing said current instructions and issuing on each issue cycle a set of high priority instructions from said instruction buffer to said plurality of operation-dedicated execution pipelines such that each issued current instruction is assigned to its tagged execution pipeline and on each cycle a number of issued instructions is not greater than a maximum number, wherein said common instruction buffer prioritizes instructions to improve utilization of said plurality of execution pipelines, the buffering capacity of the common instruction buffer selected so that the common instruction buffer has at least as many slots as the number of threads.

9. The multi-threaded graphics processor of claim 8, wherein said instruction buffer has a buffer capacity selected such that each thread has one guaranteed slot.

10. The multi-threaded graphics processor of claim 8, wherein said instruction scheduler, in response to detecting a backlog of instructions requiring a particular execution pipeline, increases the priority of issuing instructions to said particular execution pipeline.

11. The multi-threaded graphics processor of claim 8, wherein said instruction scheduler generates a prioritization based on at least one of an instruction age of instructions in said common instruction buffer, a thread type associated with each instruction in said common instruction buffer, and a number of instructions in said common instruction buffer requiring the services of each of said plurality of different types of execution pipelines.

12. The multi-threaded graphics processor of claim 8, wherein said instruction scheduler disqualifies from issuance on a particular issue cycle any instruction that would generate a deleterious condition if issued on that particular issue cycle.

13. The multi-threaded graphics processor of claim 12, wherein said instruction scheduler disqualifies instructions requiring the services of an execution pipeline that is unavailable to perform said operation for at least one issue cycle.

14. The multi-threaded graphics processor of claim 8, wherein there are a positive integer number N of execution pipelines, and said instruction scheduler may issue a positive integer number, M, of instructions per issue cycle, where M is less than or equal to N.

15. The multi-threaded graphics processor of claim 14, wherein M is less than N.

16. The graphics processor of claim 8, further comprising a computational thread type.

17. A multi-threaded graphics processor, comprising:

a thread pool of asynchronous threads of different types, comprising vertex threads, pixel threads and computational threads, each thread corresponding to a set of instructions required to perform one or more operations;

a plurality of operation-dedicated execution units for servicing different classes of operations, each execution unit adapted to execute instructions required to perform one or more operations for their corresponding thread, the one or more operations within a given class of operations;

a common instruction buffer buffering a set of instructions for a set of asynchronous threads, the common instruction buffer comprising a thread tagger to tag each instruction to indicate an execution unit to execute the instruction according to the class of the one or more operations for which the each instruction is required; and an instruction scheduler for scheduling instructions for issue into their tagged execution units, the instruction scheduler comprising a qualification and a prioritization modules for distributing the instructions for issue to their tagged execution units to improve the utilization of the execution units.

18. The multi-threaded graphics processor of claim 17, wherein the plurality of operation-dedicated execution units are selected from a list comprising:

an execution unit dedicated to perform texture operations;

an execution unit dedicated to perform blending operations; and an execution unit dedicated to perform mathematical operations.

19. A multi-threaded graphics processor configured to improve execution unit utilization, comprising:

a thread pool of asynchronous threads of different types, comprising pixel threads, vertex threads, and computational threads, each thread corresponding to a set of instructions required to perform one or more operations;

a plurality of operation-dedicated execution units for servicing different classes of operations, each execution unit adapted to execute instructions required to perform one or more operations for their corresponding thread, the one or more operations within a given class of operations;

a common instruction buffer buffering a set of instructions for a set of asynchronous threads, each instruction tagged with a corresponding operation-dedicated execution unit according to the class of the one or more operations for which the each instruction is required an instruction scheduler for distributing the instructions for issue into their tagged execution units, the instruction scheduler comprising a qualification module and a prioritization module for selecting the instructions for issuance at any particular time to improve the utilization of the plurality of operation-dedicated execution units.

20. The multi-threaded graphics processor of claim 19, wherein the plurality of operation-dedicated execution units are selected from a list comprising:

an execution unit dedicated to perform texture operations;

an execution unit dedicated to perform blending operations; and an execution unit dedicated to perform mathematical operations.

\* \* \* \* \*